(12) United States Patent
Osada et al.

(10) Patent No.: US 10,450,921 B2
(45) Date of Patent: Oct. 22, 2019

(54) EXHAUST PURIFICATION SYSTEM

(71) Applicant: ISUZU MOTORS LIMITED, Shinagawa-ku, Tokyo (JP)

(72) Inventors: Katsushi Osada, Ayase (JP); Takehito Imai, Yokohama (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 0 days.

(21) Appl. No.: 16/090,136

(22) PCT Filed: Mar. 23, 2017

(86) PCT No.: PCT/JP2017/011671
§ 371 (c)(1),
(2) Date: Sep. 28, 2018

(87) PCT Pub. No.: WO2017/170108
PCT Pub. Date: Oct. 5, 2017

(65) Prior Publication Data
US 2019/0120110 A1   Apr. 25, 2019

(30) Foreign Application Priority Data

Mar. 28, 2016 (JP) .................. 2016-064111

(51) Int. Cl.
*F01N 3/20* (2006.01)
*B01D 53/94* (2006.01)
(Continued)

(52) U.S. Cl.
CPC .......... *F01N 3/2073* (2013.01); *B01D 53/94* (2013.01); *B01D 53/9431* (2013.01);
(Continued)

(58) Field of Classification Search
CPC . F01N 3/2073; B01D 53/9431; B01F 5/0606; B01F 5/0473; B01F 3/04049
(Continued)

(56) References Cited

U.S. PATENT DOCUMENTS 8,371,114 B2   2/2013   Hayashi et al.
2010/0132345 A1   6/2010   Solbrig et al.
(Continued)

FOREIGN PATENT DOCUMENTS

DE   102013223956 A1   5/2015
EP   1712751 A2   10/2006
(Continued)

OTHER PUBLICATIONS

Extended European Search Report a for related European Application No. 17774649.2, dated Dec. 7, 2018; 8 pages.
(Continued)

*Primary Examiner* — Tom P Duong
(74) *Attorney, Agent, or Firm* — Procopio, Cory, Hargreaves & Savitch LLP

(57) ABSTRACT

An exhaust purification system is equipped with: a linear exhaust pipe through which exhaust gas emitted from an engine passes; an injection nozzle that injects a reducing agent into the exhaust pipe at an oblique angle with respect to the axial direction of the pipe; a reduction catalyst that is provided in the exhaust system downstream from the injection nozzle, and that purifies the exhaust gas by causing the exhaust gas to react with the reducing agent; and a mixer member that is provided inside the exhaust pipe 13, downstream from the injection nozzle, and that causes the reducing agent to mix with the exhaust gas and diffuse. The mixer member includes multiple fins protruding downstream, and
(Continued)

is arranged inclined inside the exhaust pipe such that the upstream surface thereof faces the injection opening surface of the injection nozzle.

4 Claims, 3 Drawing Sheets

(51) Int. Cl.
    *F01N 3/28*     (2006.01)
    *B01F 3/04*     (2006.01)
    *B01F 5/04*     (2006.01)
    *B01F 5/06*     (2006.01)

(52) U.S. Cl.
    CPC ........ *B01F 3/04049* (2013.01); *B01F 5/0473* (2013.01); *B01F 5/0606* (2013.01); *F01N 3/208* (2013.01); *F01N 3/2892* (2013.01); *F01N 2240/20* (2013.01); *F01N 2610/02* (2013.01); *F01N 2610/1453* (2013.01)

(58) Field of Classification Search
    USPC .................................................. 422/176, 177
    See application file for complete search history.

(56) References Cited

U.S. PATENT DOCUMENTS

| 2015/0218996 A1* | 8/2015 | Brandl ................ B01F 5/0268 60/295 |
| 2015/0267587 A1 | 9/2015 | Calvo |
| 2016/0298518 A1 | 10/2016 | Kloeckner et al. |

FOREIGN PATENT DOCUMENTS

| EP | 2592246 A2 | 5/2013 |
| JP | 2009-024654 A | 2/2009 |
| JP | 2012-072771 A | 4/2012 |
| WO | 2013088923 A1 | 6/2013 |

OTHER PUBLICATIONS

International Search Report and Written Opinion for related International Application No. PCT/JP2017/011671, dated May 16, 2017; English translation of ISR provided; 7 pages.

* cited by examiner

[FIG.1]
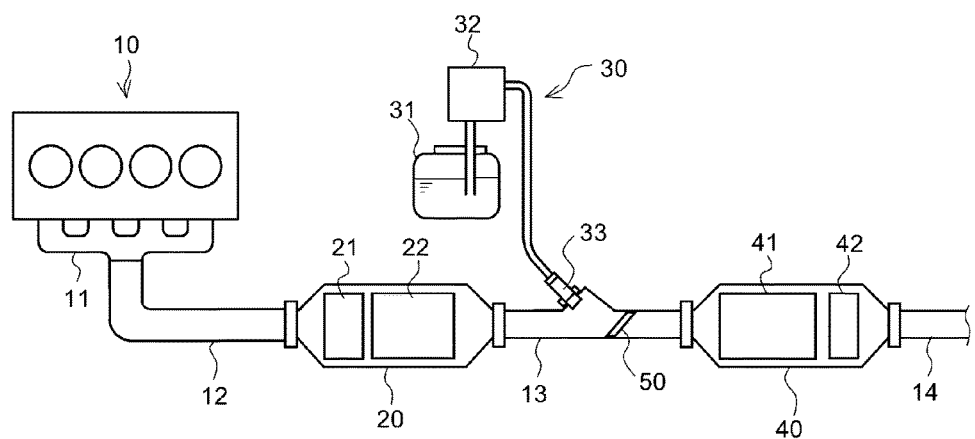
[FIG.2]
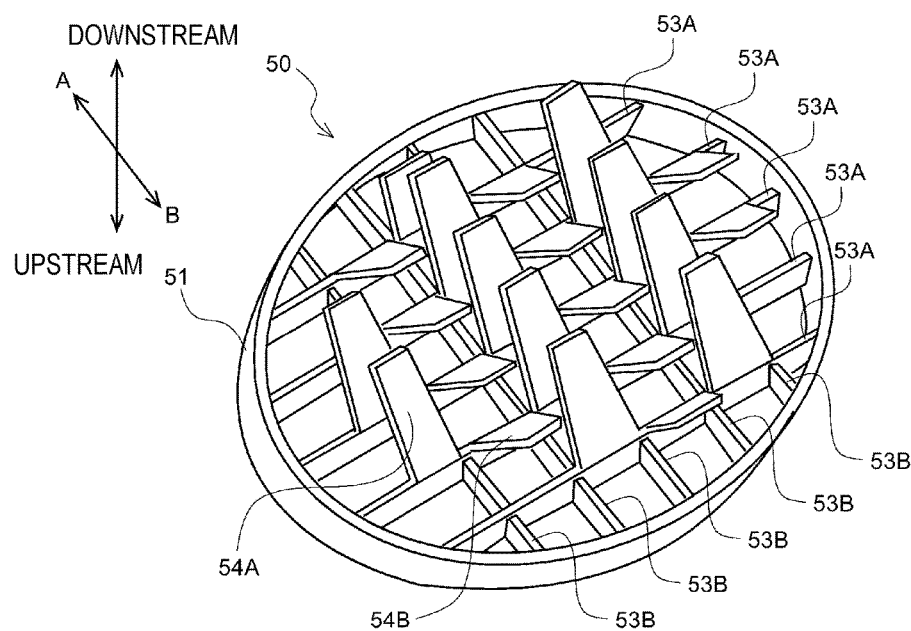

[FIG.3]
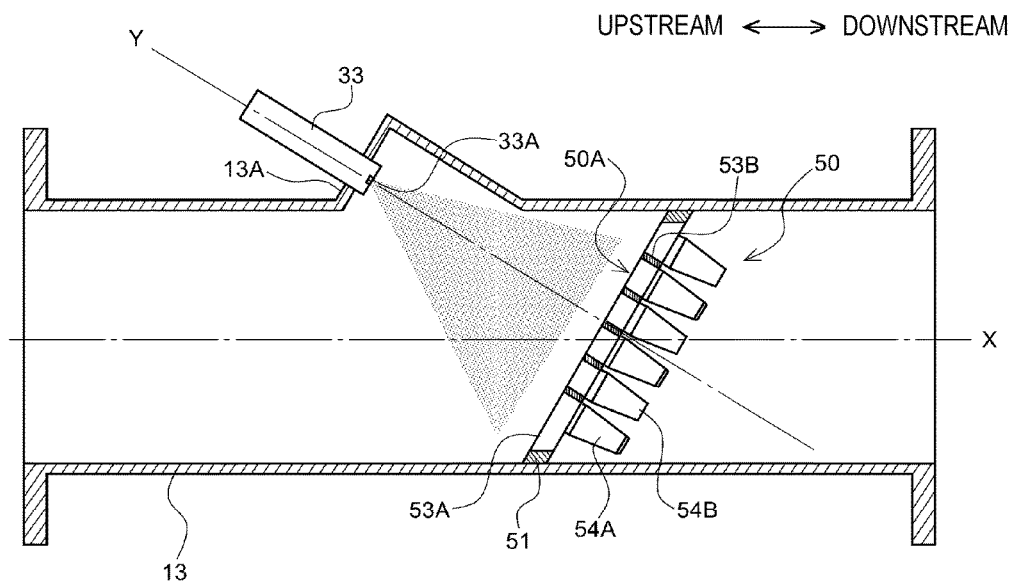
[FIG.4]
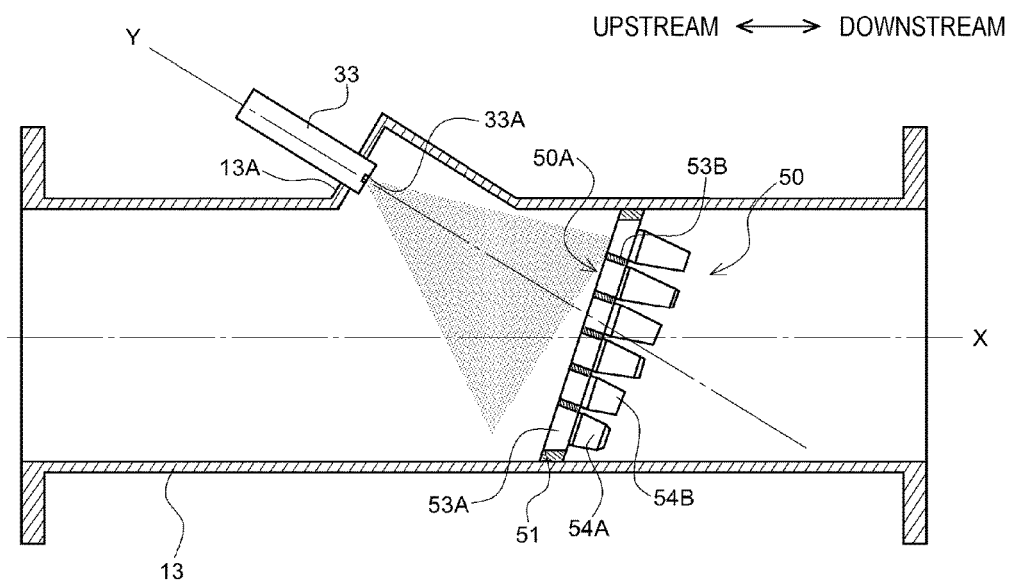

[FIG.5]
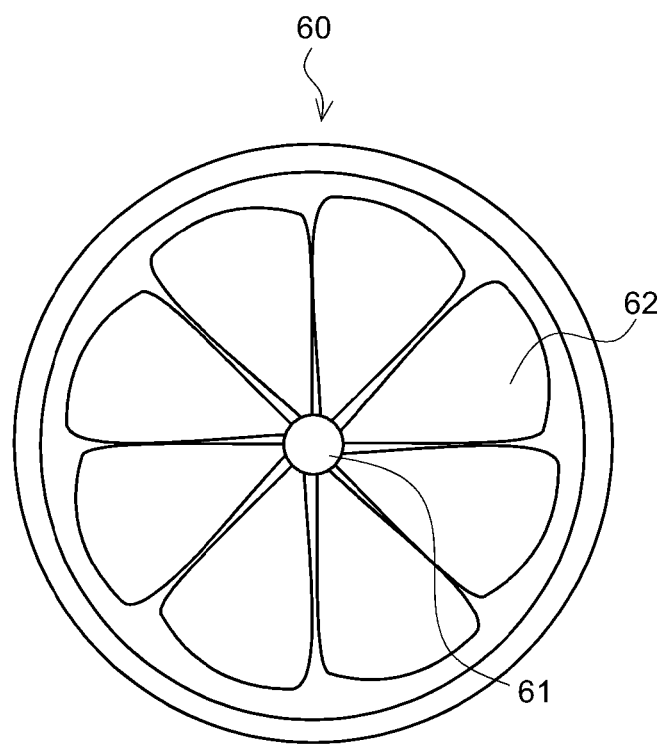

EXHAUST PURIFICATION SYSTEM

CROSS-REFERENCE TO RELATED APPLICATIONS

This application is a U.S. National Stage entry of PCT Application No: PCT/JP2017/011671 filed on Mar. 23, 2017, which claims priority to Japanese Patent Application No. 2016-064111, filed Mar. 28, 2016, the contents of which are incorporated herein by reference.

TECHNICAL FIELD

This disclosure relates to an exhaust purification system, and particularly to an exhaust purification system which is provided with a reduction catalyst.

BACKGROUND ART

There has been known that such an exhaust purification system includes an injection nozzle that adds urea water into an exhaust pipe, and a selective reduction catalyst (referred to as SCR catalyst hereinafter) that takes ammonia generated from the urea water by hydrolysis with exhaust heat as a reducing agent and reduces and purifies nitrogen compounds (referred to as NOx hereinafter) contained in exhaust gas.

When distribution of the reducing agent supplied to the SCR catalyst is uneven, the ammonia becomes excessive in a region where a supply amount is large while the NOx cannot be sufficiently reduced and purified in a region where a supply amount is insufficient. Therefore, in order to improve reduction efficiency, it is necessary to mix and diffuse the reducing agent in the exhaust gas so as to evenly distribute the reducing agent in the SCR catalyst. For example, there is disclosed in PTL 1 a technology in which a mixer plate that includes a plurality of fins is provided between a reducing agent injection nozzle and an SCR catalyst so that a reducing agent can be efficiently mixed and diffused in exhaust gas.

CITATION LIST

Patent Literature

PTL 1: JP-A-2009-24654

SUMMARY OF INVENTION

Technical Problem

Incidentally, in the technology described in PTL 1, the mixer plate is arranged vertically with respect to a pipe axial direction of an exhaust pipe and urea water is injected obliquely from the injection nozzle into the exhaust pipe with respect to the pipe axial direction. For this reason, the urea water obliquely injected in a substantially conical shape from the injection nozzle cannot collide with an entire surface of the plate, and particularly a plate region which is distant from the injection nozzle cannot be utilized effectively.

An object of the disclosure is to provide a system in which urea water (reducing agent) injected from an injection nozzle can effectively collide with an entire mixer member.

Solution to Problem

The system of the disclosure includes an exhaust pipe, which has a straight line shape, and through which exhaust gas discharged from an engine flows; an injection nozzle configured to inject a reducing agent into the exhaust pipe in a direction obliquely with respect to a pipe axial direction into the exhaust pipe; a reduction catalyst provided in an exhaust system that is on a downstream side of the injection nozzle and configured to purify the exhaust gas by reacting the exhaust gas with the reducing agent; and a mixer member provided inside the exhaust pipe on the downstream side of the injection nozzle and on an upstream side of the reduction catalyst and configured to mix and diffuse the reducing agent with the exhaust gas, in which the mixer member includes a plurality of fins protruding to the downstream side, and the mixer member is arranged inside the exhaust pipe in an inclined manner such that an upstream side surface of the mixer member, which is on an opposite side of the fins, faces an injection port surface of the injection nozzle.

The mixer member may be arranged inside the exhaust pipe in an inclined manner such that the upstream side surface is perpendicular to an injection axial direction of the injection nozzle.

The linear piping may be formed in a cylindrical shape, and the mixer member may include a ring member having an elliptic annular shape, an outer periphery of the ring member being fixed to an inner periphery of the linear piping, a plurality of the plate members arranged inside the ring member in a grid shape, and the plurality of fins that is integrally formed with the plurality of plate members and is bent at a predetermined angle.

The injection nozzle may be configured to inject urea water into the linear piping and the reduction catalyst may be a selective reduction catalyst that takes ammonia generated from the urea water by hydrolysis with exhaust heat as a reducing agent and reduces and purifies nitrogen compounds contained in the exhaust gas.

Advantageous Effects of Invention

According to the system of the disclosure, the urea water (reducing agent) injected from the injection nozzle can collide with the entire mixer member effectively.

BRIEF DESCRIPTION OF DRAWINGS

FIG. 1 is a schematic overall configuration diagram illustrating an exhaust purification system according to one embodiment of the present disclosure.

FIG. 2 is a schematic perspective view illustrating a mixer member according to one embodiment of the present disclosure.

FIG. 3 is a schematic cross-sectional view illustrating main parts of an exhaust purification system according to one embodiment of the present disclosure.

FIG. 4 is a schematic cross-sectional view illustrating main parts of an exhaust purification system according to another embodiment of the present disclosure.

FIG. 5 is a schematic front view illustrating a mixer according to another embodiment of the present disclosure.

DESCRIPTION OF EMBODIMENTS

Hereinafter, an exhaust purification system according to one embodiment of the present disclosure will be described based on the accompanying drawings. Same reference numbers are attached to same components, and names and functions thereof are also the same. Therefore, detailed descriptions with respect to these same components will not be repeated.

As shown in FIG. 1, an exhaust system of a diesel engine (hereinafter, simply referred to as engine) 10 is provided with an exhaust manifold 11, an upstream piping 12, a front stage casing 20, a linear piping 13, a rear stage casing 40 and a discharge piping 14, in order from an exhaust upstream side.

The upstream piping 12 is formed in a substantially cylindrical shape, and an upstream end thereof is connected to the exhaust manifold 11 and a downstream end thereof is connected to an upstream side opening part of the front stage casing 20.

The front casing 20 is formed in a substantially cylindrical shape, and a first oxidation catalyst 21 and a filter 22 are accommodated therein in order from the exhaust upstream side.

The first oxidation catalyst 21 is formed by supporting a catalyst component or the like on a surface of a ceramic carrier such as a cordierite honeycomb structure, for example. When unburned fuel is supplied by post injection of the engine 10 or by exhaust pipe injection of an exhaust pipe nozzle (not shown), the first oxidation catalyst 21 oxides the unburned fuel and raises exhaust temperature.

The filter 22, for example, is formed by arranging a number of cells divided by porous partition walls along a flow direction of exhaust, and alternately sealing upstream sides and downstream sides of the cells. The filter 22 collects particulate matter (PM) in the exhaust to fine pores or surfaces of the partition walls, and performs filter forced regeneration in which the PM are burned and removed when a PM accumulation estimation amount reaches a predetermined amount.

The linear piping 13 is formed in a substantially straight cylindrical shape, and connects a downstream side opening part of the front stage casing 20 and an upstream side opening part of the rear stage casing 40. An injection nozzle 33 configuring a part of a urea water injection device 30 is provided in the linear piping 13, and a mixer plate 50 that will be described in detail later is further provided in the linear piping 13 on a downstream side of the injection nozzle 33.

The urea water injection device 30 includes a urea water tank 31 that stores urea water, a urea water pump 32 that pumps up the urea water from the urea water tank 31 and an injection nozzle 33 that injects the urea water into the linear piping 13. The urea water that is injected from the injection nozzle 33 into the linear piping 13 generates ammonia (NH3) by hydrolysis with exhaust heat and the ammonia is supplied to an SCR catalyst 41 on the downstream side as a reducing agent.

The rear stage casing 40 is formed in a substantially cylindrical shape, and the SCR catalyst 41 and a second oxidation catalyst 42 are accommodated therein in order from the exhaust upstream side.

The SCR catalyst 41 is formed by supporting zeolite or the like on a porous ceramic carrier, for example. The SCR catalyst 41 absorbs ammonia that is supplied from the injection nozzle 33 as the reducing agent, and selectively reduces and purifies NOx from the exhaust passing through by the absorbed ammonia.

The second oxidation catalyst 42 is formed by, for example, supporting a catalyst component or the like on a surface of a ceramic carrier such as a cordierite honeycomb structure, and has a function of oxidizing ammonia slipped from the SCR catalyst 41 to the downstream side.

Next, detailed configurations of a mixer member 50 of the present embodiment will be described based on FIG. 2.

As shown in FIG. 2, configuration of the mixer member 50 includes an elliptic annular shaped ring member 51, a plurality of plate members 53A, 53B that are arranged in a grid shape inside the ring member 51 so as to form an exhaust gas passage, and a plurality of fins 54A, 54B that are formed integrally with the plate members 53A and protrude toward the exhaust downstream side. Each of the fins 54A, 54B is formed by making a V-shaped notch on the plate member 53A and bending a left portion in a trapezoid shape at a predetermined angle. Further, each of the fins 54A, 54B is formed such that fins 54A bent in one direction (direction A as shown) and fins 54B bent in another direction (direction B as shown) are alternately arranged in parallel.

Accordingly, the fins 54A, 54B bent in opposite directions are alternately arranged, so that turbulence is generated in the exhaust gas passing through the mixer member 50, and mixing and diffusing of the reducing agent with the exhaust gas is effectively promoted. Further, a plurality of fins 54A, 54B is attached with the urea water and contacts with high temperature exhaust gas that passes through, so that efficiency of generating ammonia from the urea water is effectively improved.

Next, configurations of the linear piping 13 and the mixer member 50 of the present embodiment will be described based on FIG. 3.

As shown in FIG. 3, the injection nozzle 33 is fixed to a seat portion 13A of the linear piping 13 by a bolt or the like (not shown) such that an injection axis Y of the injection nozzle 33 is inclined with respect to a pipe axial direction X of the linear piping 13 at a predetermined angle. In the mixer member 50, an outer periphery of the ring member 51 is fixed to an inner periphery of the linear piping 13 by welding or the like, such that an upstream side surface 50A (a side surface on an opposite side of fins 54A, 54B) of the mixer member 50 is inclined with respect to the pipe axial direction X and is perpendicular to the injection axis Y. Incidentally, the upstream side surface 50A of the mixer member 50 is not necessarily completely perpendicular to the injection axis Y of the injection nozzle 33 and may incline ±5 degrees.

That is, the mixer member 50 is mounted inside the linear piping 13 such that the upstream side surface 50A thereof faces substantially in parallel with an opening surface of an injecting opening 33A of the injection nozzle 33. Accordingly, the upstream side surface 50A of the mixer member 50 is made to face the injection nozzle 33 directly, so that the urea water (reducing agent) injected in a substantially conical shape from the injection nozzle 33 collides with an entire surface of the upstream side surface 50A evenly.

As described specifically above, according to the present embodiment, the mixer member 50 is mounted inside the linear piping 13 in an inclined manner and the upstream side surface 50A of the mixer member 50 faces the injecting opening 33A of the injection nozzle 33 directly, so that the urea water injected in a substantially conical shape from the injection nozzle 33 can collide with the entire surface of the upstream side surface 50A evenly. Accordingly, the entire mixer member 50 can be utilized effectively to promote mixing and diffusing of the exhaust gas with the reducing agent, and reducing efficiency of the SCR catalyst 41 can be reliably improved.

Further, by distributing the ammonia (reducing agent) on the SCR catalyst 41 evenly, it is possible to suppress ammonia slip effectively, and capacity reduction of the second oxidation catalyst 42 on the downstream side or cost reduction of the entire device can be effectively realized.

Incidentally, the present disclosure is not limited to the above-described embodiment and can be appropriately modified and practiced without departing from the spirit of the present disclosure.

For example, as shown in FIG. 4, an inclination angle of the mixer member 50 may be set gentler than that in the above embodiment. For example, the mixer member 50 may be arranged inside the exhaust pipe in an inclined manner such that the upstream side surface 50A of the mixer member 50 is about 60 degrees to about 85 degrees with respect to the injection axis Y of the injection nozzle 33. In this case, by setting a bending angle of each of the fins 54A, 54B to an acute angle as separating from the injection nozzle 33, attachment of the urea water to the fins 54A, 54B can be promoted effectively.

Further, a mechanism for mixing and diffusing the reducing agent and the exhaust gas is not limited to the mixer member 50, and as shown in FIG. 5, a mixer 60 which includes a plurality of blades (fins) 62 radially provided around a hub 61 can also be used. In this case, an upstream side surface of the mixer 60 may be arranged in an inclined manner to face the injection nozzle 33 (see FIG. 3) directly.

Further, the engine 10 is not limited to a diesel engine, and the present invention can be applied to other internal combustion engines such as a gasoline engine.

The present application is based on Japanese Patent Application No. 2016-064111 filed on Mar. 28, 2016, contents of which are incorporated herein as reference.

INDUSTRIAL APPLICABILITY

The present invention has an effect of enabling urea water (reducing agent) injected from an injection nozzle collide with an entire mixer member effectively, and can be used as an exhaust purification system or the like.

REFERENCE SINGS LIST 10 engine
11 exhaust manifold
12 upstream piping
13 linear piping
20 front stage casing
30 urea water injecting device
31 urea water tank
32 urea water pump
33 injection nozzle
40 rear stage casing
41 SCR catalyst
50 mixer member
51 ring member
53A, B plate member
54A, B fin

The invention claimed is:

1. An exhaust purification system comprising:
an exhaust pipe, which has a straight line shape, and through which exhaust gas discharged from an engine flows;
an injection nozzle configured to inject a reducing agent into the exhaust pipe in a direction obliquely with respect to a pipe axial direction;
a reduction catalyst provided in an exhaust system that is on a downstream side of the injection nozzle and configured to purify the exhaust gas by reacting the exhaust gas with the reducing agent; and
a mixer member provided inside the exhaust pipe on the downstream side of the injection nozzle and on an upstream side of the reduction catalyst and configured to mix and diffuse the reducing agent with the exhaust gas,
wherein the mixer member comprises a plurality of fins protruding to the downstream side, and wherein the mixer member is arranged inside the exhaust pipe in an inclined manner such that an upstream side surface of the mixer member, which is on an opposite side of the fins, faces an injection port surface of the injection nozzle,
wherein the linear piping is formed in a cylindrical shape, and
wherein the mixer member comprises:
a ring member having an elliptic annular shape, an outer periphery of the ring member being fixed to an inner periphery of the linear piping;
a plurality of plate members arranged inside the ring member in a grid shape; and
the plurality of the fins that is integrally formed with the plurality of plate members and is bent at a predetermined angle.

2. The exhaust purification system according to claim 1, wherein the mixer member is arranged inside the exhaust pipe in an inclined manner such that the upstream side surface is perpendicular to an injection axial direction of the injection nozzle.

3. The exhaust purification system according to claim 1, wherein the injection nozzle is configured to inject urea water into the linear piping, and
wherein the reduction catalyst is a selective reduction catalyst that takes ammonia generated from the urea water by hydrolysis with exhaust heat as a reducing agent and reduces and purifies nitrogen compounds contained in the exhaust gas.

4. The exhaust purification system according to claim 1, wherein the linear piping is formed in a cylindrical shape, and
wherein the mixer member comprises:
a ring member having an elliptic annular shape, an outer periphery of the ring member being fixed to an inner periphery of the linear piping;
a hub of plate members arranged at a center of the ring member; and
the plurality of the fins radially provided around the hub.

* * * * *